(No Model.) 2 Sheets—Sheet 1.

J. R. HAWKINS.
SNOW AND DIRT CART.

No. 552,876. Patented Jan. 7, 1896.

WITNESSES:
William Goebel.

INVENTOR
J. R. Hawkins
BY Munn & Co
ATTORNEYS.

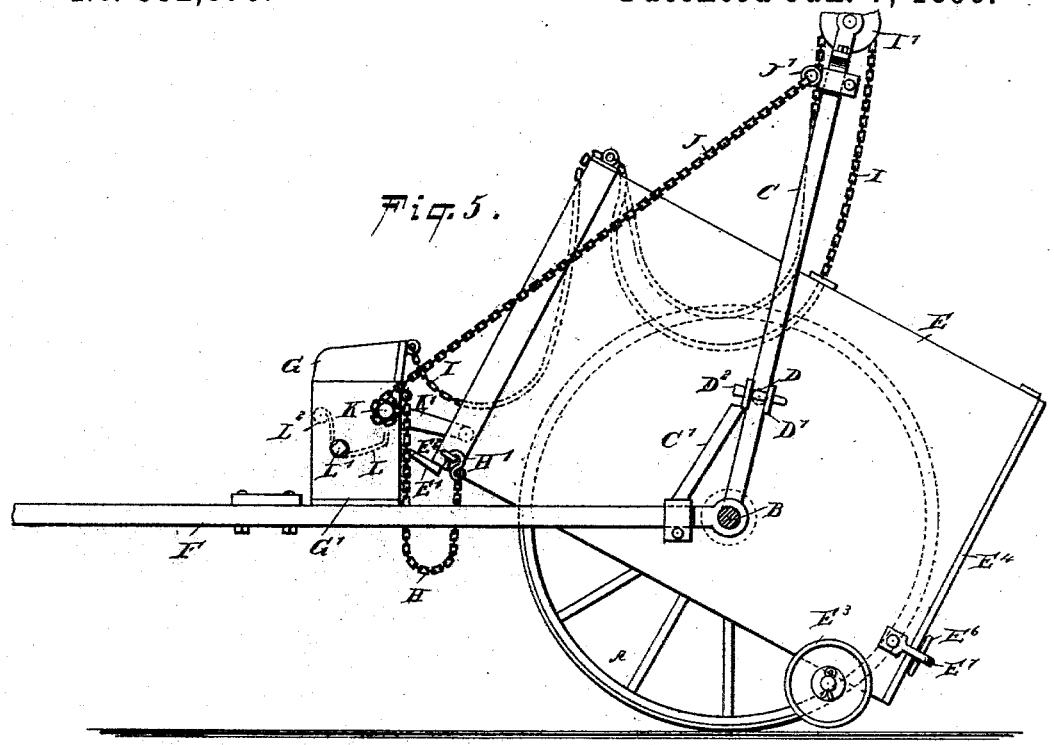
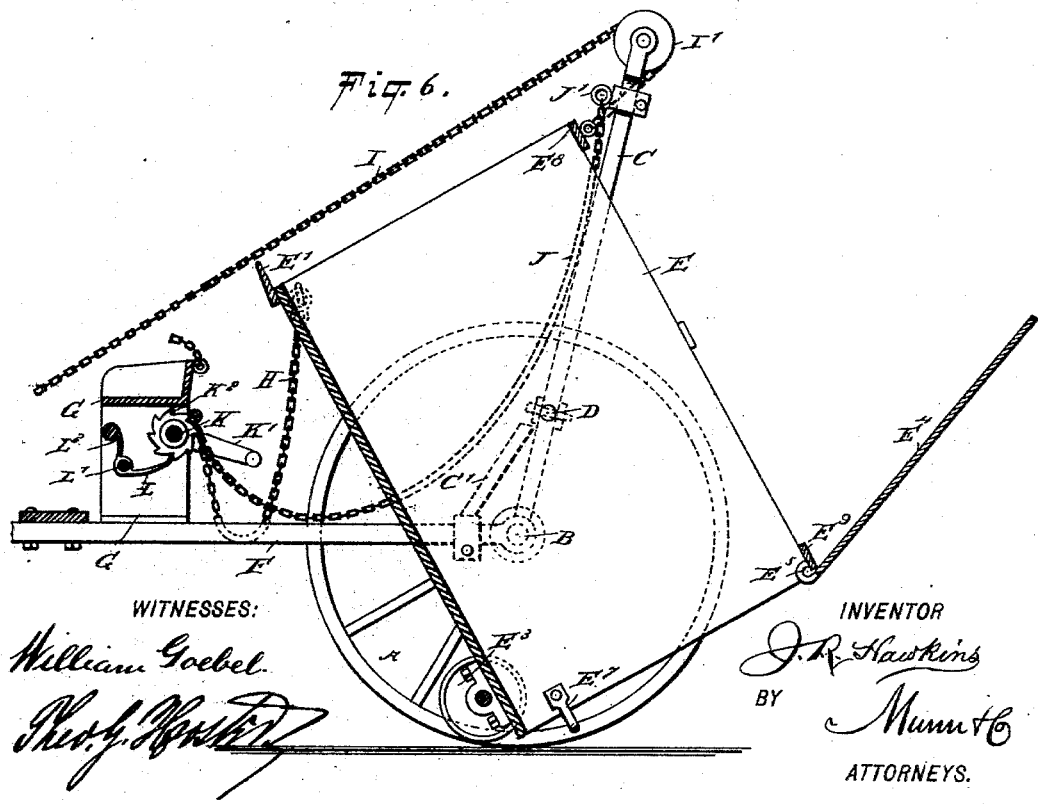

UNITED STATES PATENT OFFICE.

JAY RUBE HAWKINS, OF MOUNTAINVILLE, NEW YORK.

SNOW AND DIRT CART.

SPECIFICATION forming part of Letters Patent No. 552,876, dated January 7, 1896.

Application filed April 16, 1895. Serial No. 545,853. (No model.)

*To all whom it may concern:*

Be it known that I, JAY RUBE HAWKINS, of Mountainville, in the county of Orange and State of New York, have invented a new and Improved Snow and Dirt Cart, of which the following is a full, clear, and exact description.

The invention relates to street-cleaning machines, and its object is to provide a new and improved cart which is simple and durable in construction, very effective in operation, and arranged to scrape up and remove the dirt, snow and ice from the street, and to permit of conveniently dumping the accumulated contents of the cart whenever deemed necessary.

The invention consists in certain parts and details and combinations of the same, as will be hereinafter fully described and then pointed out in the claims.

Reference is to be had to the accompanying drawings, forming a part of this specification, in which similar letters of reference indicate corresponding parts in all the views.

Figure 1:
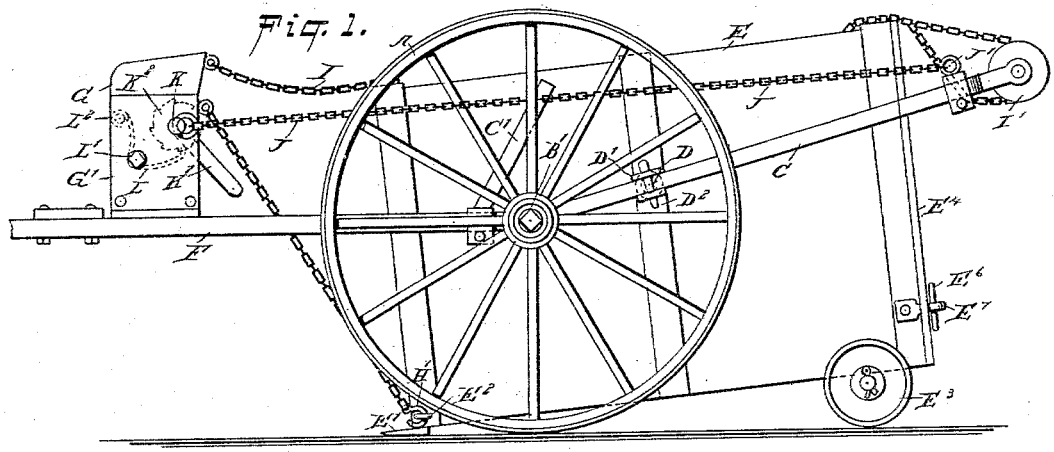
Figure 2:
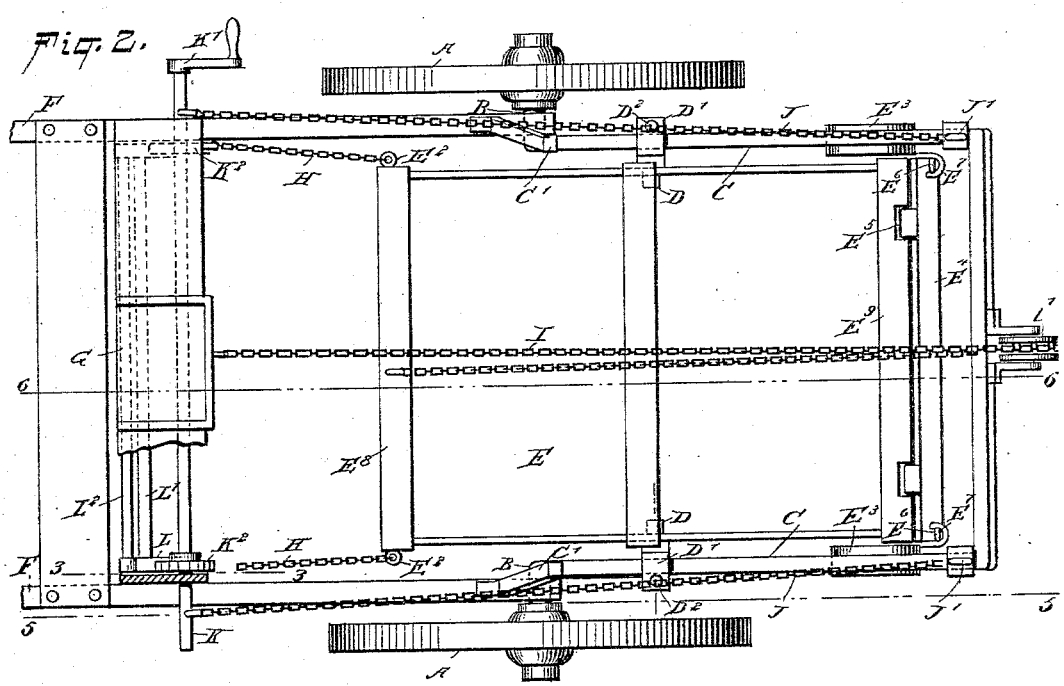
Figure 3:
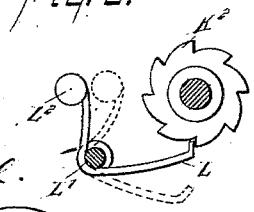
Figure 4:
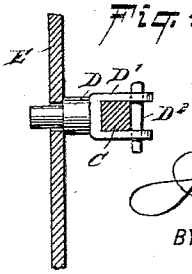

Figure 1 is a side elevation of the improvement. Fig. 2 is a plan view of the same. Fig. 3 is an enlarged sectional side elevation of the locking and releasing device for the winding-shaft on the line 3 3 of Fig. 2. Fig. 4 is an enlarged cross-section of one of the trunnions for the cart-body. Fig. 5 is a sectional side elevation of the improvement on the line 5 5 of Fig. 2, and with the cart-body in an inclined position for filling or loading the material into the rear part of the cart-body; and Fig. 6 is a sectional side elevation of the improvement, on the line 6 6 of Fig. 2, in the position for dumping the contents of the cart-body.

The improved snow and dirt cart is provided with the wheels A, adapted to travel on the ground and mounted on axles B, projecting from the ends of a U-shaped frame C, carrying on its side bars adjustable trunnions D, located directly opposite each other and engaging the sides of the cart-body E, so that the latter can swing on the said trunnions for a purpose hereinafter more fully described. On the axles B are journaled the rear ends of the shafts F, in which the animal for propelling the cart is hitched, the said shafts supporting a seat G for the driver and manipulator of the cart.

The cart E is preferably made of sheet metal, and is provided at the front end of its bottom with a scraper E', adapted to scrape up the snow, ice, dirt, &c., in the street over which the cart is drawn. On the sides of the cart E, at the front end thereof and near to the bottom, are arranged eyes $E^2$, engaged by hooks H' of chains H, extending upwardly and forwardly to connect at their upper ends with the rear part of the seat-frame G' supporting the seat G. The chains H serve to prevent the front end of the cart—that is, the scraper E'—from passing too far down in case of unevenness in the street-surface. The rear end of the cart E is provided with small wheels $E^3$ for holding this rear end a suitable distance above the street-surface, to cause the bottom of the cart to stand in an inclined position while scraping off the dirt, snow or ice, the said wheels also serving to permit of conveniently drawing the cart along.

The rear end of the cart-body E is adapted to be closed by a door $E^4$, pivotally connected at $E^5$ to a cross-bar $E^9$ connecting the sides of the cart with each other at the rear end thereof. Normally the door $E^4$ is locked in place in a closed position, and for this purpose I provide the sides of the cart-body with eyes $E^7$ extending through recesses in the door $E^4$, the said eyes being engaged by pins $E^6$ abutting against the outer face of the door $E^4$, to securely lock the latter in a closed position. When the pins $E^6$ are removed from the eyes $E^7$, then the door is free to swing open.

When it is desired to load the scraped-up material into the rear part of the cart-body E, then the driver swings the cart E upward at its free end into the inclined position shown in Fig. 5, to permit the scraped-up material to slide into the rear part of the cart-body E, as this rear part is now the lowermost part of the cart-body. In order to enable the driver to conveniently do this, a chain or rope I is provided, attached at its front end to the seat-frame G, to then extend rearwardly over the cart-body to pass around a pulley I', journaled in suitable bearings attached to the middle part of the frame C, as plainly indicated in the drawings. The lower run of the chain or rope I extends forwardly from the pulley I', and is attached to the front cross-bar E³, connecting the sides of the cart-body with each other at the top. Now it will be seen that when the operator pulls forwardly on the upper run of the chain or rope I, an upward pull is exerted on the frame C, and simultaneously on the cross-bar E³ of the cart-body E, so that the latter finally assumes the position shown in Fig. 5, to cause the accumulated material in the front part of the cart-body to slide down on the inclined bottom to the rear part of the cart. As soon as this has been done, the operator releases the chain or rope I, so that the frame C again swings downward and the front end of the cart-body E moves likewise downward to bring the scraper E' again in contact with the street-surface.

For dumping the accumulated contents of the cart-body E, I provide the following device: Chains or ropes J, extending on the sides of the cart-body E, are connected at their rear ends to eyes J' attached to the side bars of the frame C at or near the middle portion of the said frame, as plainly indicated in the drawings. The front ends of the chains J are attached to a winding-shaft K, extending transversely and mounted to turn in suitable bearings arranged in the seat-frame G'. On one outer end of the shaft K is secured a crank-arm K', adapted to be turned by the operator, to rotate the shaft K so as to wind up the chains J on the said shaft, and to cause an outward swinging of the frame C until the latter moves against stops C', held adjustable on the side bars of the shafts F, as plainly shown in Fig. 6. The door E⁴, which had previously been unlocked by removing the pins E⁶, now swings open to permit the contents of the cart-body E to drop through the rear open end of the cart-body to the ground. In order to insure the removal of all the accumulated material, the cart-body E can be swung into a still more inclined position by the operator pulling on the chain or rope I, to cause the cart-body E to swing on its trunnions until it assumes the position shown in Fig. 6.

In order to lock the winding-shaft K after the frame C has been swung up against the stops C' to enable the operator to pull the said chain I, I provide the shaft K with ratchet-wheels K² adapted to be engaged by pawls L, projecting from a shaft L' journaled in the sides of the frame G' and provided with a handle L² adapted to be taken hold of by the operator, so as to impart a swinging motion to the shaft L' to move the pawls L out of contact with the ratchet-wheels K² whenever it is again desired to unlock the winding-shaft K. The handle L² extends transversely under the bottom of the seat G, so that the operator can conveniently take hold of the said handle to release the winding-shaft K, as above described.

The trunnions D are held adjustable on the side bars of the frame C, and for this purpose I provide each trunnion D with a forked end D', (see Fig. 4,) to straddle opposite sides of the side bars, the outer ends of the forked arms being engaged by a key D² to securely lock the fork and side bar of the frame together.

It will be seen that by the arrangement described the snow, ice, dirt and other material in the path of the cart-body are scraped up by the scraper E' and passed into the front end of the cart-body E, and when a sufficient quantity of material has accumulated in this front part of the cart-body then the operator manipulates the chain or rope I, as previously described, to cause the said material to slide back into the rear part of the cart-body. When, finally, a sufficient quantity of material has accumulated in the cart-body to necessitate dumping, then the pins E⁶ are removed to unlock the door E⁴, and then the chains J are wound upon the shaft K, as previously described, to swing the cart-body E into a dumping position to cause the contents of the cart-body to slide out of the rear open end of the cart-body to the dumping-place.

Having thus described my invention, I claim as new and desire to secure by Letters Patent—

1. A cart of the class described, comprising a frame mounted to swing, trunnions held on the said frame, a cart body engaged at its sides by the said trunnions to permit of swinging the cart body into an inclined position, the front end of the cart body being provided at its bottom with a scraper, and stops to limit the upward swinging movement of the frame, substantially as shown and described.

2. A cart of the class described, comprising a frame mounted to swing, adjustable trunnions held on the said frame, and a cart body engaged at its sides by the said trunnions to permit of swinging the cart body into an inclined position, the front end of the cart body being provided at the bottom thereof with a scraper, substantially as shown and described.

3. A cart of the class described, comprising a cart body formed at its front end with a scraper and at its rear end with a door, wheels for supporting the rear end of the cart body, a frame carrying trunnions engaging the sides of the said cart body, means, substantially as described, for imparting a swinging motion to the said frame, and stops for limiting the upward swinging motion of the said frame, as set forth.

4. A cart of the class described, comprising a cart body formed at its front end with a scraper and at its rear end with a door, wheels for supporting the rear end of the cart body, a frame carrying trunnions engaging the sides of the said cart body, means for imparting a swinging motion to the frame, stops for limiting the upward swinging motion of the said frame, and means for swinging the cart body on its trunnions when the said frame is in its upper position, substantially as shown and described.

5. A cart of the class described, comprising shafts, a frame carrying axles engaged by the said shafts, wheels mounted on the said axles, a cart body hung in the said frame and provided at its front open end with a scraper and at its rear end with a door, and wheels for supporting the rear end of the said cart body, to hold the bottom thereof in an inclined position to bring the scraper close to the ground, substantially as shown and described.

6. A cart of the class described, comprising shafts, a frame carrying axles engaged by the said shafts, wheels mounted on the said axles, a cart body hung in the said frame and provided at its front open end with a scraper and at its rear end with a door, wheels for supporting the rear end of the cart body to hold the bottom thereof in an inclined position to bring the scraper close to the ground, and a chain attached at one end to the cart body and passing over a pulley on the said frame to permit the operator to swing the cart body into an inclined position, substantially as shown and described.

7. A cart of the class described, comprising a cart body, a frame provided with axles for carrying the cart wheels, the said cart body being hung in the said frame, chains connected with the said frame to swing the same, a winding shaft on which the said chains are adapted to be wound up, stops to limit the upward movement of the frame, and means for locking the said winding shaft in position, substantially as shown and described.

8. A cart of the class described, comprising a cart body, a frame provided with axles for carrying the cart wheels, the said cart body being hung in the said frame, chains connected with the said frame, a winding shaft on which the said chains are adapted to be wound up, the said shaft being provided with ratchet wheels, a shaft having pawls projecting therefrom and adapted to engage the said ratchet wheels to lock the winding shaft in position, the shaft carrying the pawls being provided with a handle to manipulate the same, substantially as shown and described.

JAY RUBE HAWKINS.

Witnesses:
C. SEDGWICK,
F. W. HANAFORD.